United States Patent [19]

Herd

[11] Patent Number: 4,978,746
[45] Date of Patent: Dec. 18, 1990

[54] REACTIVE NAPHTHYL AZA PYRIDONE DYESTUFFS

[75] Inventor: Karl-Josef Herd, Odenthal, Fed. Rep. of Germany

[73] Assignee: Bayer Aktiengesellschaft, Leverkusen, Fed. Rep. of Germany

[21] Appl. No.: 439,895

[22] Filed: Nov. 20, 1989

Related U.S. Application Data

[63] Continuation of Ser. No. 161,547, Feb. 29, 1988.

[30] Foreign Application Priority Data

Mar. 10, 1987 [DE] Fed. Rep. of Germany ....... 3707550

[51] Int. Cl.⁵ .................. C09B 62/085; C09B 62/245; C09B 62/51; D06P 1/384
[52] U.S. Cl. ............................ 534/632; 534/583; 534/593; 534/595; 534/635; 534/887
[58] Field of Search ................. 534/642, 635

[56] References Cited

U.S. PATENT DOCUMENTS 4,659,807 4/1987 Segal, I ..................... 534/642

FOREIGN PATENT DOCUMENTS 0169457 1/1986 European Pat. Off. ............ 534/642

Primary Examiner—Floyd D. Higel
Attorney, Agent, or Firm—Sprung Horn Kramer & Woods

[57] ABSTRACT

A dyestuff of the formula

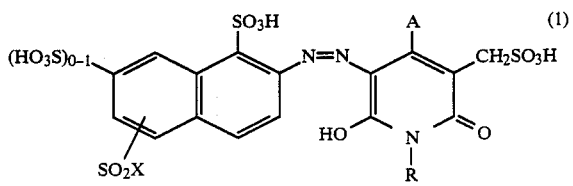

wherein
A = H, unsubstituted $C_1$–$C_4$, $C_1$–$C_4$-alkyl substituted by OH, $SO_3H$ or COOH or phenyl or COOR',
R' = H or $C_1$–$C_4$-alkyl,
X = —CH=$CH_2$ or —$CH_2C_2$—Y,
Y = —$OSO_3H$, —$SSO_3H$, —$OCOCH_3$ or Cl,
R = H, unsubstituted $C_1$–$C_4$-alkyl, or $C_1$–$C_4$ alkyl substituted by OH, $SO_3H$, COOH, or $OSO_3H$ or NR"Z, wherein
R" = H, unsubstituted $C_1$–$C_4$-alkyl or $C_1$–$C_4$-alkyl substituted by a substituent selected from the group consisting of OH, $SO_3H$, COOH, $OSO_3H$, and Z = a heterocyclic fiber reactive radical selected from the group consisting of 2,4-dichlorotriazin-6-yl, monohalogeno-sym.-triazinyl, monohalogenopyrimidinyl, dihalogenopyrimidinyl and trihalogenopyrimidinyl. Such dyestuff gives, on cellulose or polypeptide materials, high yields of brilliant yellow dyeings with outstanding wet—and oxidation—fastnesses and a high stability of the fiber—dyestuff bond.

12 Claims, No Drawings

REACTIVE NAPHTHYL AZA PYRIDONE DYESTUFFS

This is a continuation of application Ser. No. 07/161,547, filed Feb. 29, 1988, now pending.

The present invention relates to reactive dyestuffs of the formula

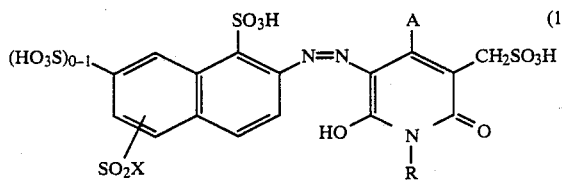

wherein
A=H, optionally substituted $C_1$–$C_4$-alkyl or aryl or COOR',
R'=H or optionally substituted $C_1$–$C_4$-alkyl,
X=—CH=CH$_2$ or —CH$_2$CH$_2$—Y,
Y=a radical which can be eliminated under alkaline conditions and
R=H or optionally substituted $C_1$–$C_4$-alkyl, aryl or aralkyl Examples of suitable radicals Y are —OSO$_3$H, —SSO$_3$H, —OCOCH$_3$, —OPO$_3$H$_2$, —OSO$_2$CH$_3$, —SCN, —NHSO$_2$CH$_3$, —Cl, —Br, —F, —N($C_1$–$C_4$-alkyl)$_2$, —OCOC$_6$H$_5$, —OSO$_2$—C$_6$H$_4$—CH$_3$, —N($C_1$–$C_4$-alkyl)$_3$$^\oplus$Cl$^\ominus$ and —N($C_1$–$C_4$-alkyl)$_3$$^\oplus$$SO_4^{2\ominus}$.

Examples of possible substituents for the alkyl radicals are: —Cl, —OH, —O$C_1$–$C_4$-alkyl, —SO$_3$H, —OSO$_3$H, CO$_2$H and —NR"Z, where R"=H or optionally substituted $C_1$–$C_4$-alkyl (in particular substituted by OH, SO$_3$H, COOH or OSO$_3$H) and Z=a heterocyclic fibre-reactive radical, in particular a radical of the triazine or pyrimidine series, or an acyl radical, in particular $C_1$–$C_4$-alkylcarbonyl, $C_1$–$C_4$-alkylsulphonyl or optionally substituted arylcarbonyl or arylsulphonyl.

Particularly suitable aryl radicals in the context of the present application are phenyl radicals which are optionally substituted by Cl, SO$_3$H, O$C_1$–$C_4$-alkyl, $C_1$–$C_4$-alkyl or COOH.

Examples of suitable aralkyl radicals are phenyl-$C_1$–$C_4$-alkyl radicals, which can be substituted as described above.

Examples of suitable radicals R which are substituted by fibre-reactive radicals are

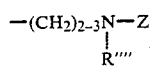

wherein
R""=H or $C_1$–$C_4$-alkyl, optionally substituted by OH, COOH, SO$_3$H or OSO$_3$H.

A large number of suitable heterocyclic fibre-reactive radicals are described in the literature. Examples which may be mentioned are: 2,4-dichlorotriazin-6-yl and monohalogeno-sym.-triazinyl radicals, in particular monochloro- and monofluorotriazinyl radicals which are substituted by amino, monoalkylamino, dialkylamino, arylamino, aralkylamino, alkoxy or aryloxy, aryl preferably denoting optionally substituted phenyl or naphthyl and alkyl denoting optionally substituted $C_1$–$C_4$-alkyl, and preferred substituents being carboxyl, sulpho or sulphato.

Mono-, di- or trihalogenopyrimidinyl radicals, such as 2,4-dichloropyrimidin-6-yl, 2,4,5-trichloropyrimidin-6-yl, 2,6-dichloropyrimidin-4-ylcarbonyl, 2,5-dichloropyrimidin-5-ylcarbonyl, 2-fluoro-4-pyrimidinyl, 2,6-difluoro-5-methyl-4-pyrimidinyl, 2,6-difluoro-5-chloro-4-pyrimidinyl, 2-fluoro-6-methyl-5-chloro-4-pyrimidinyl, 2,5,6-trifluoro-4-pyrimidinyl, 5-chloro-6-chloromethyl-2-fluoro-4-pyrimidinyl, 5-chloro-6-dichloromethyl-2-fluoro-4-pyrimidinyl, 5-chloro-6-trichloromethyl-2-fluoro-4-pyrimidinyl, 5-chloro-2-trichloromethyl-6-fluoro-4-pyrimidinyl, 5-chloro-2-fluorodichloromethyl-6-fluoro-4-pyrimidinyl, 2-fluoro-5-chloro-4-pyrimidinyl, 2-fluoro-6-phenyl-4-pyrimidinyl, 6-fluoro-5-chloro-2-methyl-4-pyrimidinyl and 2-methylsulphonyl-6-methyl-4-pyrimidinyl.

Preferred dyestuffs are those of the formula

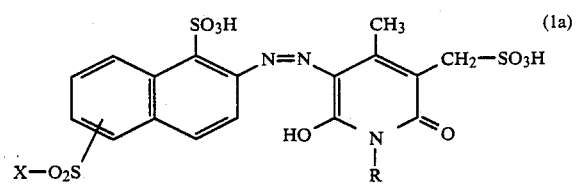

wherein
X and R have the meaning given under formula (1).
Preferred dyestuffs are furthermore those with the radical —SO$_2$X in the 6-position, in particular those of the formula

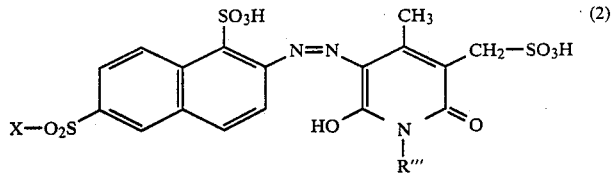

wherein
R'''=H or $C_1$–$C_4$-alkyl.
Particularly preferred dyestuffs (2) here are those in which
X 32 —CH$_2$CH$_2$OSO$_3$H and
R'''=CH$_3$ or C$_2$H$_5$.

The formulae given are those of the free acids. The salts, in particular the alkali metal salts, such as sodium, potassium or lithium salts, are in general obtained in the preparation and are also used for dyeing.

The new dyestuffs are outstandingly suitable for dyeing and printing textile structures of natural and regenerated cellulose and natural or synthetic polypeptides by the processes customary for vinylsulphone dyestuffs.

The brilliant yellow dyeings obtainable in high yields with these dyestuffs are distinguished by a high stability of the fibre-dyestuff bond; dyeings with outstanding wet-fastnesses are obtained. The decidedly high oxidation-fastnesses of these dyeings are particularly striking.

The process for the preparation of the dyestuffs of the formula (1) is characterized in that amino compounds (3) are diazotized

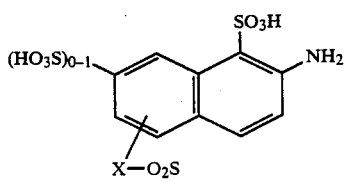
(3)

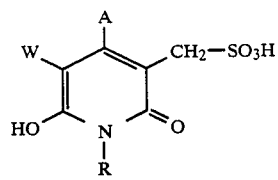
(4)

and the diazotization product is linked to the known pyridone compounds (4) in a manner which is known per se, W representing hydrogen or $CONH_2$. In the case where $W=-CONH_2$, the coupling takes place with elimination of the aminocarbonyl radical, as is described in detail, for example, in German Offenlegungsschrift No. 2,162,612.

Another process for the preparation of the dyestuffs (1) comprises a procedure in which the $-SO_2CH_2C-H_2OH$ group in dyestuffs of the formula

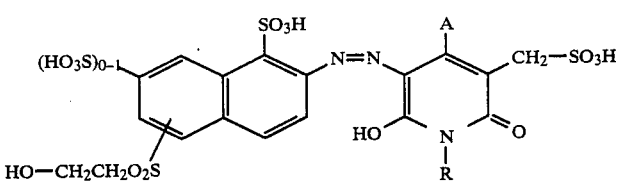

is esterified or acylated, and in particular is converted into the $-SO_2CH_2CH_2OSO_3H$ group by treatment with sulphuric acid monohydrate or oleum at 0°–30° C.

EXAMPLE 1

82.2 g of 6-(β-sulphatoethylsulphonyl)-1-sulpho-2-naphthylamine are suspended in 600 ml of water, 200 g of ice and 60 ml of approximately 30% strength aqueous hydrochloric acid are added and the mixture is diazotized rapidly with 5N sodium nitrite solution. After the mixture has been stirred at 10°–15° C. for one hour, the excess nitrous acid is removed with amidosulphonic acid. 55.2 g of 3-aminocarbonyl-1,4-dimethyl-5-sulphomethyl-6-hydroxy-2-pyridone are then added to the reaction mixture and the pH of the reaction mixture is brought slowly to 7.0 with 20% strength aqueous potassium bicarbonate solution. The mixture is subsequently stirred for 30 minutes, during which the pH is kept constant at 7.0. (Instead of the 55.2 g of pyridone, the corresponding pyridone reaction solution obtained by reaction of 36.6 g of 3-aminocarbonyl-1,4-dimethyl-6-hydroxy-2-pyridone with the equimolar amount of hydroxymethanesulphonic acid solution at 60° C./pH 7 can also be used). The yellow coupling solution is salted out with 100 g of potassium chloride and the crystalline dyestuff which has precipitated is isolated by filtration with suction.

Drying at 70° C. in vacuo gives about 145 g of a KCl-containing yellow dyestuff powder of the formula

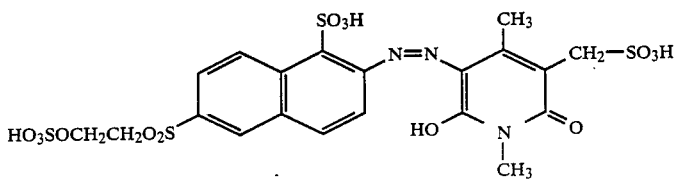

which dyes cotton in a brilliant greenish-tinged yellow colour shade ($\lambda_{max}$ ($H_2O$)=428 nm) both by the exhaustion method and by the pad cold batch method.

The following brilliant yellow dyestuffs are obtained completely analogously using the corresponding coupling components.

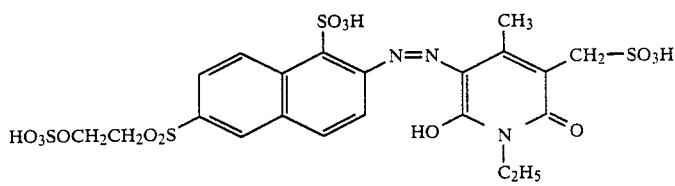

$\lambda_{max}$ = 428 nm

-continued
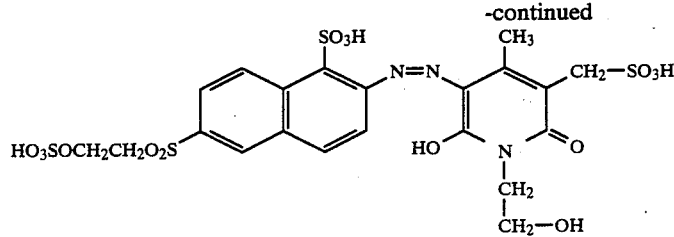
$\lambda_{max} = 430$ nm
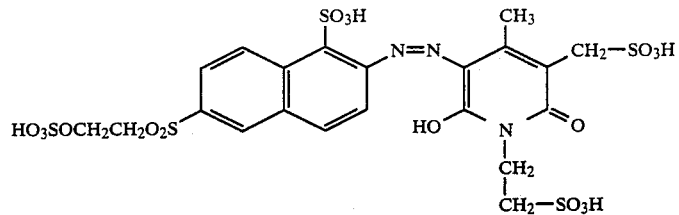
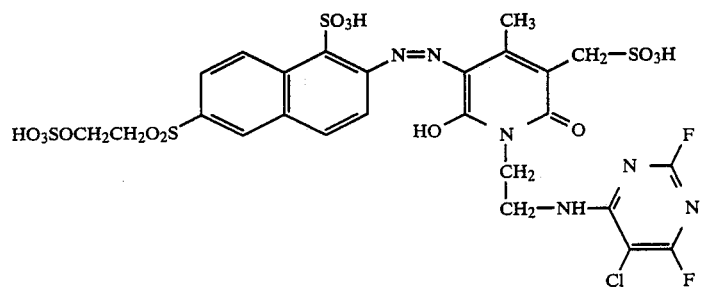
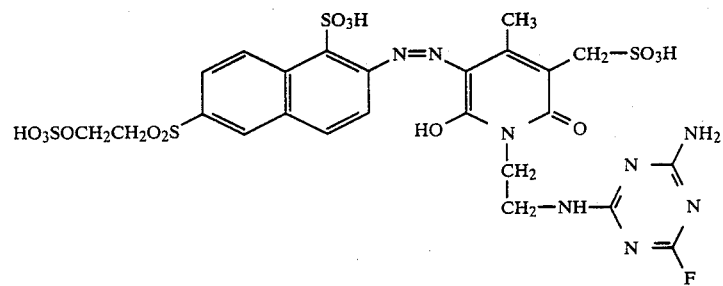
EXAMPLE 2
If the procedure followed is as in Example 1, using 5-(β-sulphatoethylsulphonyl)-1-sulpho-2-naphthylamine as the diazo component, the following yellow dyestuff is obtained:
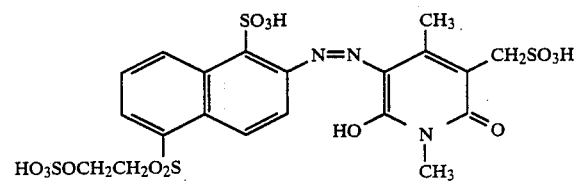
EXAMPLE 3
62 g of the azo dyestuff of the formula
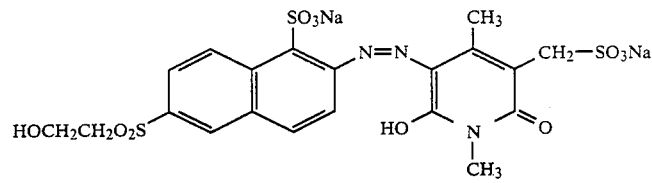

which is obtained by diazotization and coupling of 6-(β-hydroxyethylsulphonyl)-1-sulpho-2-naphthylamine with 1,4-dimethyl-3-sulphomethyl-6-hydroxy-2-pyridone, are introduced in portions into 100 ml of sulphuric acid monohydrate, with external cooling. The reaction mixture is stirred at room temperature for 2 hours and then poured onto 200 g of ice/100 ml of water. The dyestuff which has precipitated is filtered off with suction and suspended in 200 ml of water and the pH of the mixture is brought to 5.0 with solid Na dicarbonate. The dyestuff is isolated by addition of 20 g of sodium chloride. It is identical to the dyestuff described in Example 1.

EXAMPLE 4

If the dyestuff of the formula

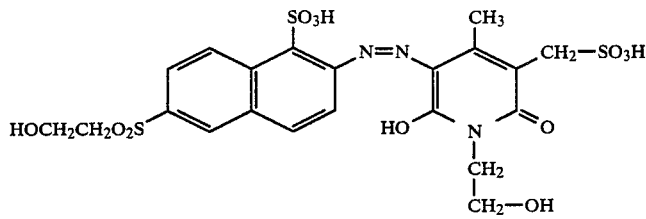

is reacted with sulphuric acid monohydrate analogously to Example 3, the dyestuff of the formula

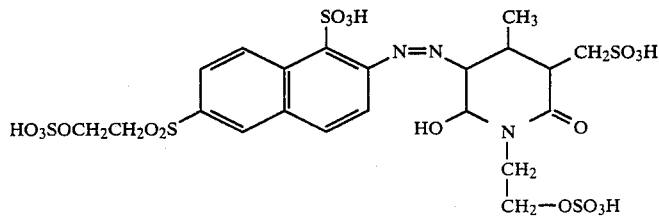

is obtained.

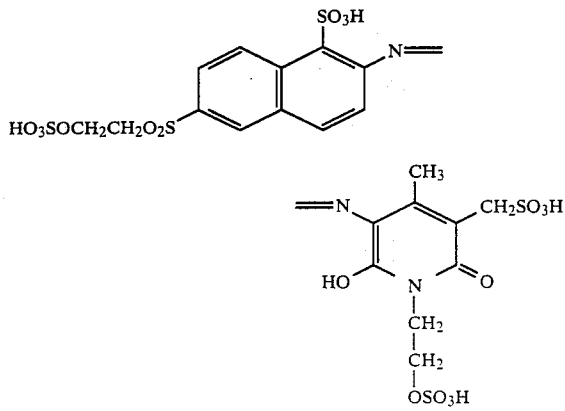

I claim:

1. A dyestuff of the formula

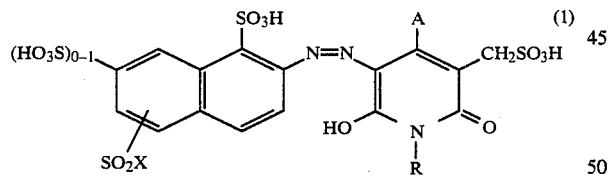

wherein
A = H, unsubstituted $C_1$-$C_4$-alkyl, $C_1$-$C_4$-alkyl substituted by a substituent selected from the group consisting of OH, $SO_3H$ and COOH or phenyl or COOR′,
R′ = H or $C_1$-$C_4$-alkyl,
X is —CH=$CH_2$ or —$CH_2C_2$—Y,
Y = —$OSO_3H$, —$SSO_3H$, —$OCOCH_3$ or Cl,
R = H, unsubstituted $C_1$-$C_4$-alkyl, or $C_1$-$C_4$ alkyl substituted by a substituent selected from the group consisting of Cl, OH, $SO_3H$, $OSO_3H$, COOH, OC$_1$-$C_4$ alkyl and NR″Z, wherein
R″ = H, unsubstituted $C_1$-$C_4$-alkyl or $C_1$-$C_4$-alkyl substituted by a substituent selected from the group consisting of OH, $SO_3H$, COOH and $OSO_3H$, and
Z = a heterocyclic fiber reactive radical selected from the group consisting of 2,4-dichlorotriazin-6-yl, monohalogeno-sym.-triazinyl, monohalopyrimidinyl, dihalogenopyrimidinyl and trihalogenopyrimidinyl.

2. A dyestuff of claim 1, where X = —$CH_2CH_2OSO_3H$.

3. A dyestuff of the formula

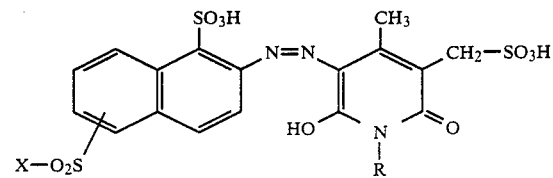

wherein
X is —CH=$CH_2$ or —$CH_2CH_2$—Y and
R is H, unsubstituted $C_1$-$C_4$-alkyl or $C_1$-$C_4$-alkyl substituted by a substituent selected from the group consisting of Cl, OH, $SO_3H$, $OSO_3H$, COOH, OC$_1$-$C_4$ alkyl or NR″Z, wherein
R″ is H, unsubstituted $C_1$-$C_4$-alkyl or $C_1$-$C_4$-alkyl substituted by a substituent selected from the group consisting of OH, $SO_3H$, COOH and $OSO_3H$,
Z is a heterocyclic fiber reactive radical selected from the group consisting of 2,4-dichlorotriazin-6-yl, monohalogeno-sym.-triazinyl, monohalogenopyrimidinyl, dihalogenopyrimidinyl and trihalogenopyrimidinyl and
Y is —$OSO_3H$, —$SSO_3H$, —$OCOCH_3$ or Cl.

4. A dyestuff of claim 3 with the radial —$SO_2X$ in the 6 position.

5. A dyestuff of claim 1 where R = H or $C_1$-$C_4$-alkyl.

6. A dyestuff of the formula

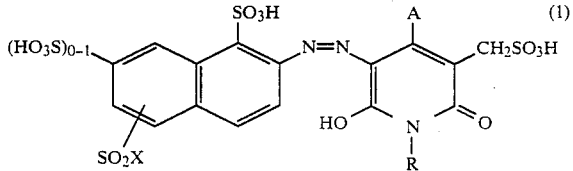

wherein
A = H, unsubstituted $C_1$-$C_4$-alkyl, $C_1$-$C_4$-alkyl substituted by a substituent selected from the group consisting of OH, SO₃H and COOH, phenyl or COOR', R'=H or C₁-C₄-alkyl, X=—CH=CH₂ or —CH₂C₂—Y, Y=—OSO₃H, —SSO₃H, —OCOCH₃ or Cl, R=H, unsubstituted C₁-C₄-alkyl, or C₁-C₄-alkyl substituted by a substituent selected from the group consisting of Cl, OH, SO₃H, OSO₃H, COOH, OC₁-C₄-alkyl and NR"Z, wherein R"=H, unsubstituted C₁-C₄-alkyl or C₁-C₄-alkyl substituted by a substituent selected from the group consisting of OH, SO₃H, COOH and OSO₃H, and Z=a heterocyclic fiber reactive radical selected from the group consisting of a substituted monochlorotriazinyl radical and a substituted monofluorotriazinyl radical, the substituents for said radicals being selected from the group consisting of amino, monoalkylamino, dialkylamino, arylamino, aralkylamino, alkoxy and aryloxy, and 2,4-dichlorpyrimidin-6-yl, 2,4,5-trichloropyrimidin-6-yl, 2,6-dichloropyrimidin-4-ylcarbonyl, 2,5-dichloropyrimidin-5-ylcarbonyl, 2-fluoro-4-pyrimidinyl, 2,6-difluoro-5-methyl-4-pyrimidinyl, 2,6-difluoro-5-chloro-4-pyrimidinyl, 2-fluoro-6-methyl-5-chloro-4-pyrimidinyl, 2,5,6-trifluoro-4-pyrimidinyl, 5-chloro-6-chloromethyl-2-fluoro-4-pyrimidinyl, 5-chloro-6-dichloromethyl-2-fluoro-4-pyrimidinyl, 5-chloro-2-trichloromethyl-2-fluoro-4-pyrimidinyl, 5-chloro-2-trichloromethyl-6-fluoro-4-pyrimidinyl, 5-chloro-2-fluorodichloromethyl-6-fluoro-4-pyrimidinyl, 2-fluoro-5-chloro-4-pyrimidinyl, 2-fluoro-6-phenyl-4-pyrimidinyl, 6-fluoro-5-chloro-2-methyl-4-pyrimidinyl and 2-methylsulphonyl-6-methyl-4-pyrimidinyl.

7. A dyestuff of claim 6, where X=—CH₂CH₂OSO₃H.

8. A dyestuff of the formula

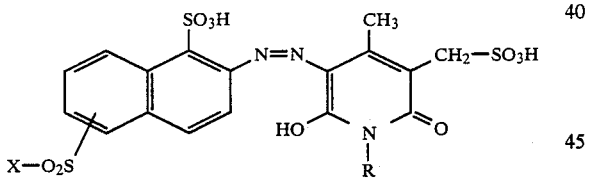

wherein

X and R have the meanings of claim 6.

9. A dyestuffs of claim 8 with the radical —SO₂X in the 6-position.

10. A dyestuff of the formula

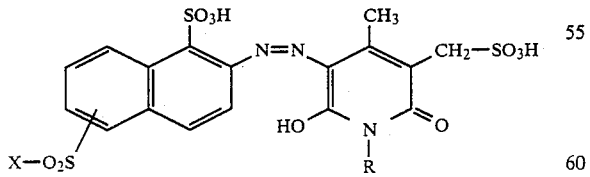

wherein

X is —CH=CH₂ or —CH₂CH₂-Y and R is H, unsubstituted C₁-C₄-alkyl or C₁-C₄-alkyl substituted by a substituent selected from the group consisting of Cl, OH, SO₃H, OSO₃H, COOH, OC₁-C₄-alkyl or NR"Z, wherein R" is H, unsubstituted C₁-C₄-alkyl or C₁-C₄-alkyl substituted by a substituent selected from the group consisting of OH, SO₃H, COOH and OSO₃H, Z is a heterocyclic fiber reactive radical selected from the group consisting of a substituted monochlorotriazinyl radical and a substituted monofluorotriazinyl radical, the substituents for said radicals being selected from the group consisting of amino, monoalkylamino, dialkylamino, arylamino, aralkylamino, alkoxy and aryloxy, and 2,4-dichloropyrimidin-6-yl, 2,4,5-trichloropyrimidin-6-yl, 2,6-dichloropyrimidin-4-ylcarbonyl, 2,5-dichloropyrimidin-5-ylcarbonyl, 2-fluoro-4-pyrimidinyl, 2,6-difluoro-5-methyl-4-pyrimidinyl, 2,6-difluoro-5-chloro-4-pyrimidinyl, 2-fluoro-6-methyl-5-chloro-4-pyrimidinyl, 2,5,6-trifluoro-4-pyrimidinyl, 5-chloro-6-chloromethyl-2-fluoro-4-pyrimidinyl, 5-chloro-6-dichloromethyl-2-fluoro-4-pyrimidinyl, 5-chloro-2-trichloromethyl-2-fluoro-4-pyrimidinyl, 5-chloro-2-trichloromethyl-6-fluoro-4-pyrimidinyl, 5-chloro-2-fluorodichloromethyl-6-fluoro-4-pyrimidinyl, 2-fluoro-5-chloro-4-pyrimidinyl, 2-fluoro-6-phenyl-4-pyrimidinyl, 6-fluoro-5-chloro-2-methyl-4-pyrimidinyl and 2-methylsulphonyl-6-methyl-4-pyrimidinyl and Y is —OSO₃H, —SSO₃H, —OCOCH₃ or Cl.

11. A dyestuff according to claim 6 of the formula

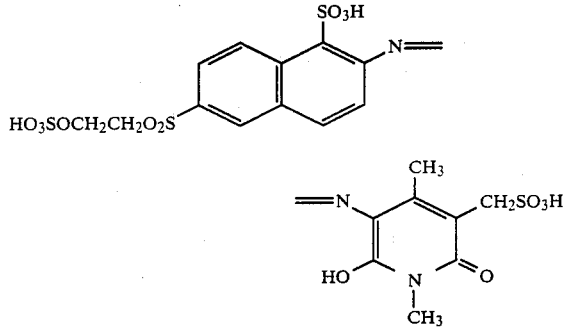

12. A dyestuff according to claim 6 of the formula